G. A. EDDY.
AUTOMATIC SELECTIVE CHANGE GEAR MECHANISM.
APPLICATION FILED JAN. 12, 1914.
1,168,715.
Patented Jan. 18, 1916.
4 SHEETS—SHEET 1.
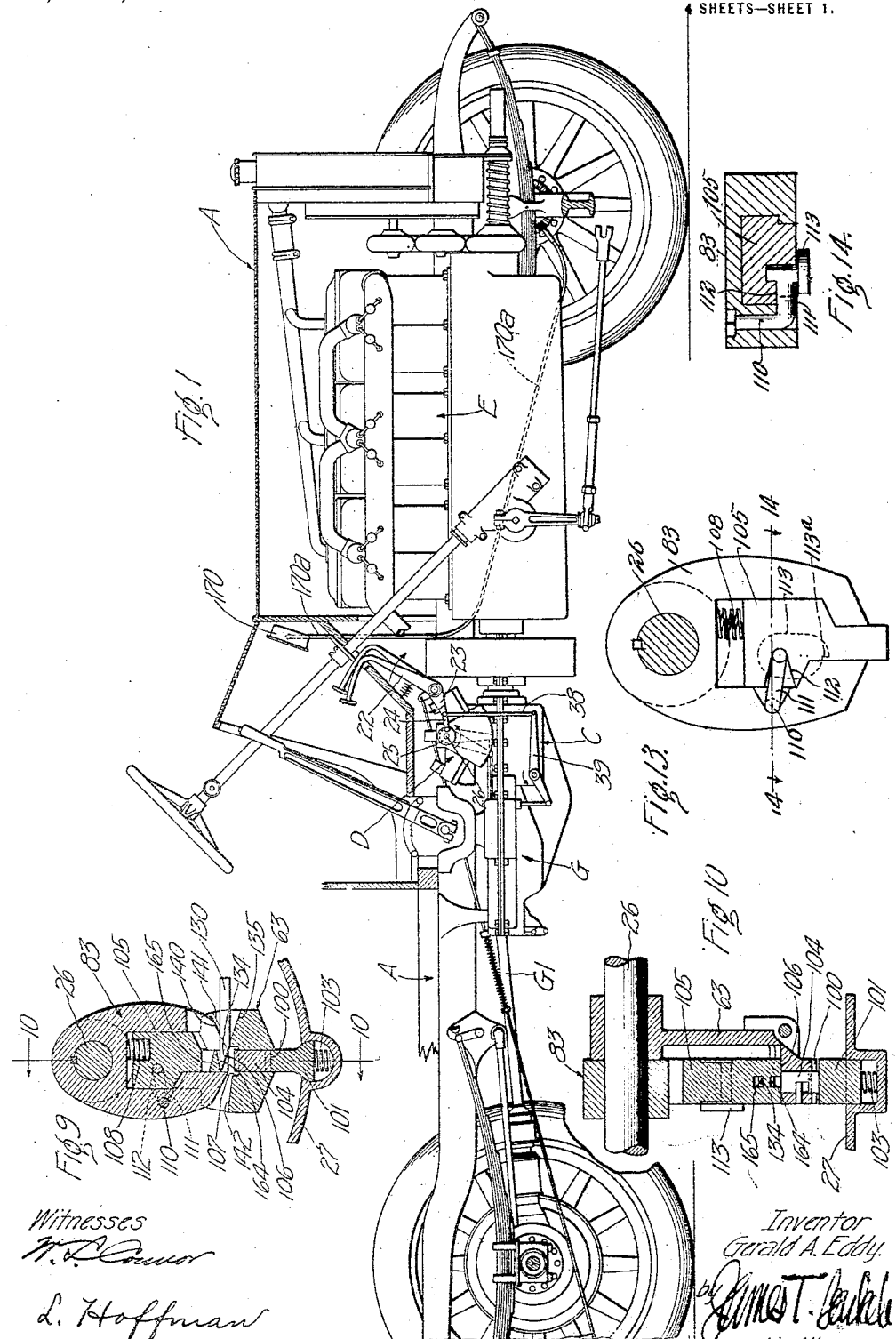
Witnesses
W. T. Connor
L. Hoffman
Inventor
Gerald A. Eddy
by James T. Leekle
his Attorney

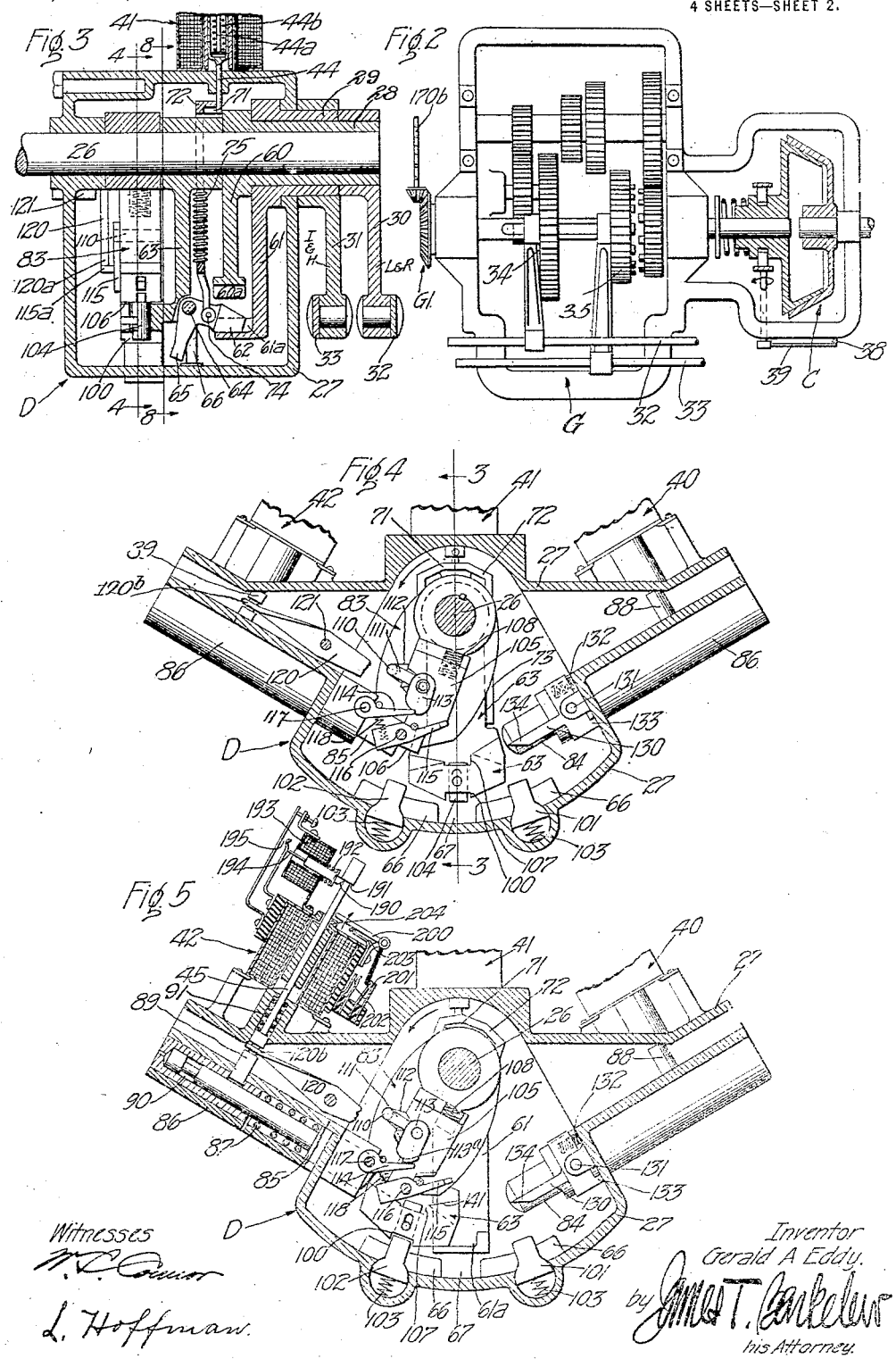

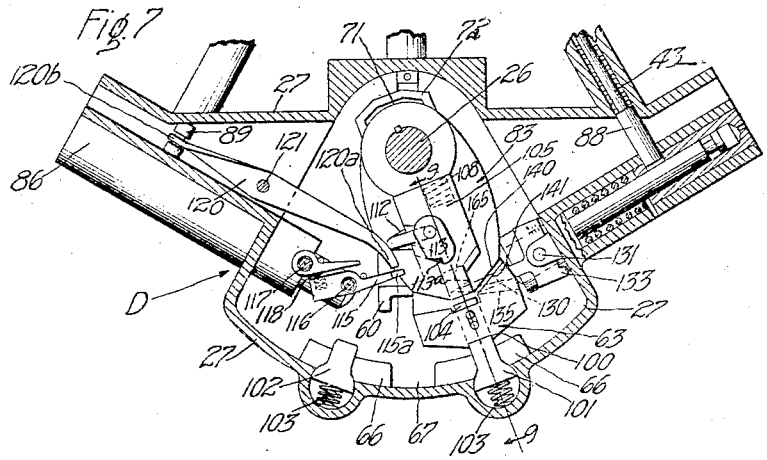
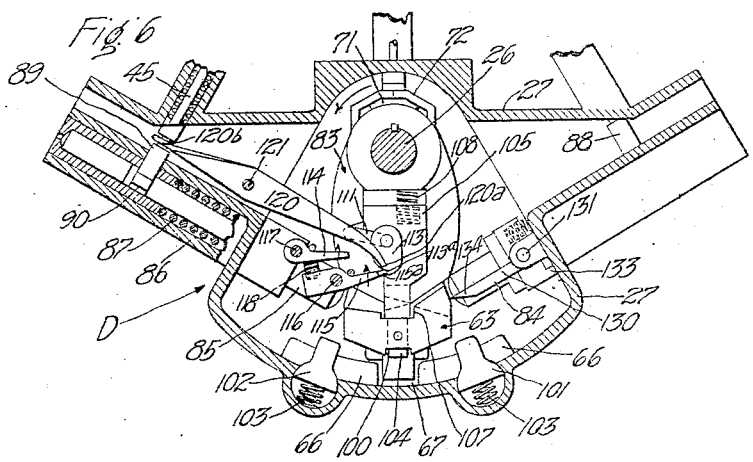
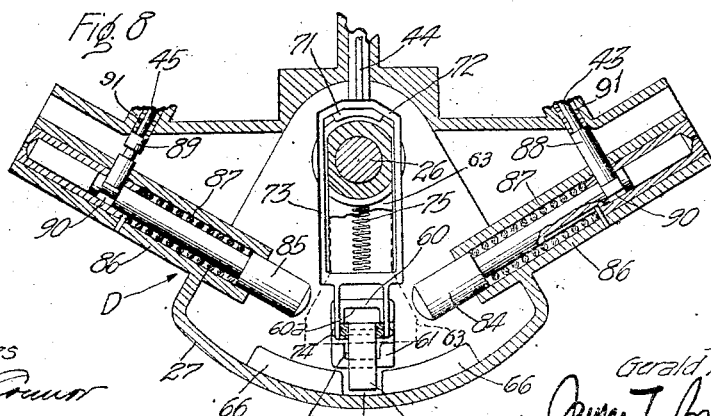

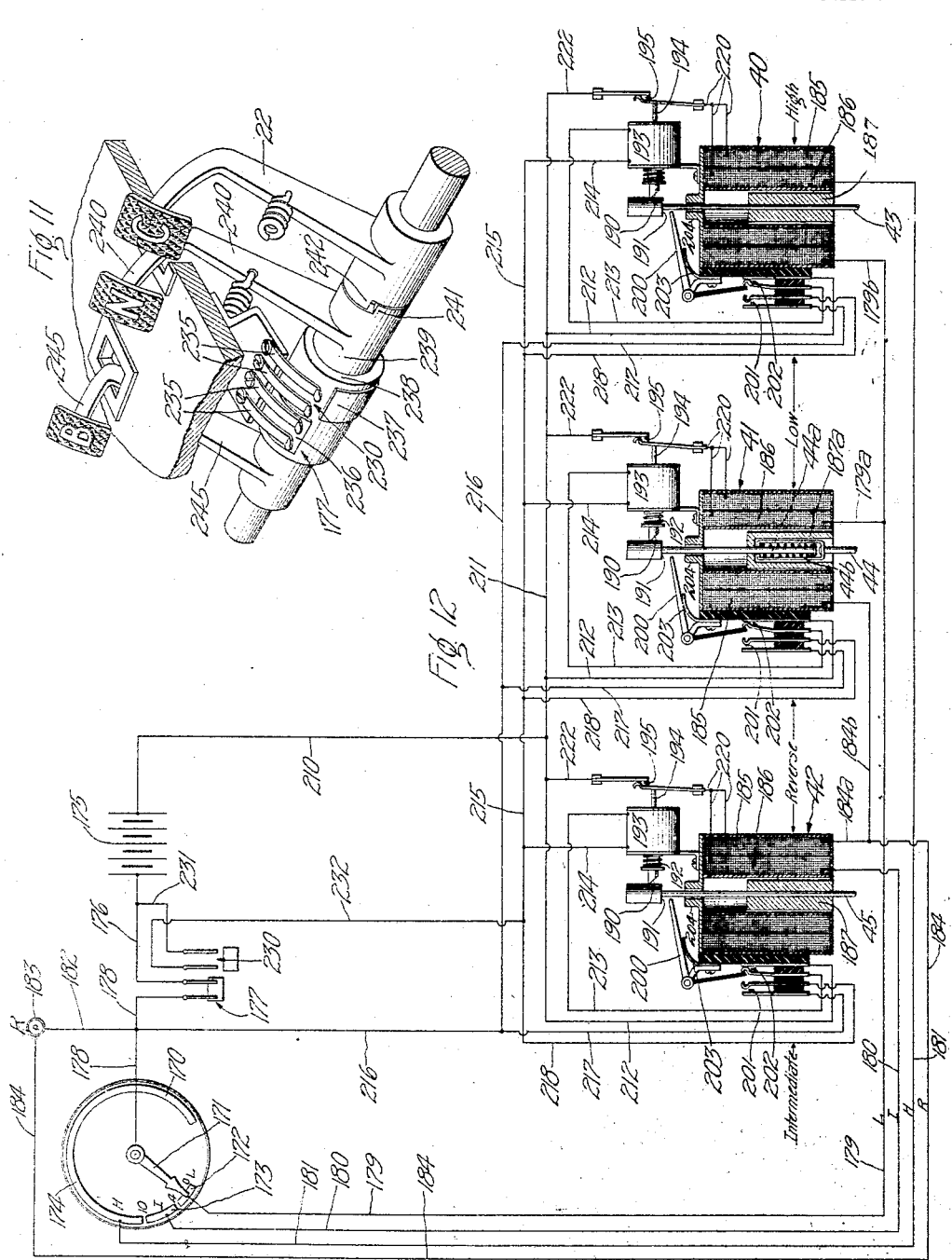

UNITED STATES PATENT OFFICE.

GERALD A. EDDY, OF LOS ANGELES, CALIFORNIA, ASSIGNOR, BY DIRECT AND MESNE ASSIGNMENTS, OF THIRTY ONE-HUNDREDTHS TO A. B. DODGE AND THIRTY ONE-HUNDREDTHS TO E. G. BELK, BOTH OF LOS ANGELES, CALIFORNIA.

AUTOMATIC SELECTIVE CHANGE-GEAR MECHANISM.

1,168,715.  Specification of Letters Patent.  Patented Jan. 18, 1916.

Application filed January 12, 1914. Serial No. 811,749.

*To all whom it may concern:*

Be it known that I, GERALD A. EDDY, a citizen of the United States, residing at Los Angeles, in the county of Los Angeles, State of California, have invented new and useful Improvements in Automatic Selective Change-Gear Mechanisms, of which the following is a specification.

This invention relates to an automatic selective change gear mechanism; and the prime object of this invention is the provision of a combination wherein selection of speeds is automatically accomplished by the actual speed of the car (or by equivalent means), and whereby the operator by a single simple motion may shift the change speed gears or other change speed mechanism into the speed automatically selected, if he so chooses.

The fundamentals of my invention in its preferred form, include (1) a speed or equivalently operated mechanism arranged to control a selective mechanism, (2) a selective mechanism actuated or controlled by the speed controlled mechanism to be thereby set in different selective positions, (3) a gear shifting device coöperating with the selective mechanism to shift the gears to the selected position by manual operation of a lever or the like, and (4) a change speed mechanism actuated by the shifting mechanism. The lever by which motion is imparted for change of the gears may be any suitable lever; it is not necessarily the clutch pedal of the automobile. Broadly my combination includes any change speed mechanism as its element (4); but for convenience, I herein speak of the ordinary change speed gear set.

In the broader view of my invention the elements (1 and 2) may be considered as one means or mechanism, as an automatically controlled selecting mechanism for setting the speed shifting mechanism for subsequent speed shifting operations.

The feature which I particularly wish to point out in this application and to hereinafter claim is the relation and coöperation of the automatic selective mechanism and the mechanism by which change of gears is effected. The automatic selective mechanism may select any combination of gears proper to the conditions under which the car is running, but it does not cause actual shifting of gears. The automobile driver may at any time actuate the change gear mechanism to throw into mesh those gears which the selective mechanism has selected, but he is not compelled to do so at any time. Should the driver wish to change gears, it is necessary only for him to operate the lever, when the gears will be changed to the arrangement selected by the automatic selective mechanism. As nearly as can be accomplished to suit the varying conditions of travel met by an automobile, the automatic selective mechanism continuously selects the correct gear arrangement which the car should theoretically be using; that is, the gear arrangement which at any time drives the car most efficiently is selected by the automatic selector. To illustrate, it is not usual that the low gear of an automobile is used except in starting and on heavy pulls. Now my automatic selective mechanism may be controlled by the amount of power necessary to pull the car at a certain speed. There have been devices proposed for directly causing changes of gearing ratio by virtue of the variation in torque between the engine and the driving wheels of the automobile. That is, as the speed rises and the torque decreases, the gears are shifted automatically to cause the automobile to run at a relatively greater speed and the engine at a relatively lesser speed. The difficulty in using this form of control is that the torque of the average automobile engine does not vary directly as the speed; that is, there is not a constant amount of energy per engine stroke or cycle. I prefer to have my selective means controlled by the speed of some part of the automobile driving gear, and preferably by that part of the driving gear which always runs at a speed having a fixed ratio to the speed of the automobile itself. Variation of speed of the automobile is perhaps as successful a means as any of measuring the torque required. I preferably make my selective mechanism to be controlled directly by a speed controlled apparatus. Thus, suppose that an automobile equipped with my apparatus is being driven over a grade, the speed of the car gradually decreasing as a summit is approached. Now the speed of the car may decrease to such a point that theoretically the car had best be driven on the low speed; but the driver may know by former experience that the car will top the grade on the high gear arrangement. Under such condition the driver will not change gears; but should he decide to do so, he will immediately throw the gear set into "low", the automatic selective mechanism having first selected "intermediate" and then "low" as the speed of the car has decreased. I speak herein of a car and change gear mechanism having three forward speeds and one reverse; but it will be seen that my invention is fundamentally applicable to any number of speeds. Reverse speed must, of course, be selected manually on all occasions.

It will be understood that the automatic selective means is continuously in operation in such manner that the driver, by manual operation, may at any and all times obtain some speed which is selected by the automatic means. Theoretically, of course, there may be an instant, on every transition of the selective means from one speed to the next, when no speed is selected; but in practice such instants of transition may be ignored and the selective mechanism may be said not only to be in continuous operation but also to preferably continuously selectively set the shifting mechanism.

In the present embodiment of my invention I have shown such a gear shifting mechanism as is shown in my joint application with John Franklin McNutt for change gear mechanisms S. N. 711,108, filed July 23rd, 1912, this mechanism being included in my present combination and typifying mechanisms which may be used to accomplish the same result in substantially the same manner. It will be understood that I do not herein claim the specific construction of this gear shifting device. I prefer to use electric energy as the motive power in the automatic selective portions of my device, although any other suitable motive power may be used for causing the operations herein set forth.

I have shown my now preferred form of invention in the accompanying drawings, in which, Figure 1 is a longitudinal section showing an automobile equipped with my invention, Fig. 2 is a plan of a typical form of gear set operated by my mechanism, Fig. 3 is a longitudinal vertical section of the change gear mechanism on line 3—3 of Fig. 4, Fig. 4 is a section taken on line 4—4 of Fig. 3, the aspect of Fig. 4 being similar to that of Fig. 1, Figs. 5, 6 and 7 are sections taken similarly to Fig. 4 showing the parts in various positions, Fig. 8 is a view taken on line 8—8 of Fig. 3, showing the parts in the same position as shown in Fig. 6, Fig. 9 is an enlarged detail section taken on line 9—9 of Fig. 7 showing the parts in one of their alternate positions. Fig. 10 is a section taken on line 10—10 of Fig. 9, showing the parts in their other alternate positions, Fig. 11 is a perspective illustrating typical arrangements of the pedals by which manual operation of my device is had, Fig. 12 is a diagram showing the electrical arrangements of my selective apparatus, Fig. 13 is a detail view showing parts in the position shown in Fig. 6, and Fig. 14 is a section taken on line 14—14 of Fig. 13.

Referring first particularly to Fig. 1 I have therein shown the body of an automobile "A", having engine "E", clutch "C" and transmission gearing "G". The engine drives through the clutch to the transmission gearing, which is typically in the form shown in Fig. 2. The clutch "C" is operated by the clutch pedal 22 through connecting members 38 and 39; and I have shown my mechanism as being manually operated by the same movement of the clutch pedal which opens and closes the clutch. The clutch pedal 22 is provided with any suitable extension 23 connected by a member 24 to a small crank disk 25 on the end of an actuating shaft 26. Shaft 26 is mounted in bearings in casing 27 of the gear changing device, generally designated by the letter "D". Around one end of shaft 26 there are arranged two concentric sleeves 28 and 29, sleeve 28 carrying an arm 30 and sleeve 29 carrying an arm 31 outside of casing 27. These arms 30 and 31 connect with rods 32 and 33 which pass through and into the case of the transmission gear mechanism "G" and there operate gears by sliding them longitudinally in the ordinary and well known manner. The arrangement is such that the oscillation of arm 30 will cause the movement of rod 32 and thereby cause the shifting of pinion 34 within the change gear mechanism so that, when the arm 30 and rod 32 and pinion 34 are forward, the transmission gearing is in its "low" arrangement, and when these parts are to the rear then the transmission is in its "reverse" arrangement. Similarly, when the arm 31 and rod 33 and gear 35 are forward, the transmission gears are in their "high" speed arrangement, while when these parts are to the rear the transmission gearing is in its "intermediate" speed arrangement.

The mechanism "D" about to be described is designed to move the arms 30 and 31 to their different positions as selected by the automatic selective mechanism. The selective mechanism is so arranged and connected with the gear changing mechanism "D" that a movement of the clutch pedal 22 forward and back will cause the shifting of the gears to the position selected by the selective mechanism. Mounted upon the gear shifting mechanism "D" there are three solenoids 40, 41 and 42 of a character to be hereinafter specifically explained. It suffices at present to say that energization of the solenoids causes upward movement of control rods 43, 44 and 45 to throw the mechanism, "D" to different positions for accomplishing different shiftings of the gears in the gear set. Arrangements are such that when the solenoid 42 alone is energized, subsequent operation of the pedal 22 will throw the gear set to "intermediate"; energization of solenoid 40 alone will similarly cause the gears to be thrown into "high"; energization of solenoids 41 and 42 simultaneously will similarly cause the gears to be shifted to "reverse," while energization of solenoids 40 and 41 will similarly cause the gears to be shifted to "low." The speed controlled mechanism accomplishes these various energizations in an automatic manner except for the "reverse" and "neutral." When all of the solenoids are deenergized, operation of the pedal will throw the gears to "neutral." The means for manually selecting "neutral" is hereinafter described. The construction and operation of the gear shifting device "D" will first be explained; subsequently the details of the automatic selective mechanism will be set forth.

On the inside of case 27 the sleeves 28 and 29 carry arms 60 and 61, which two arms I may term the gear shifting arms. These arms have suitable slots 60ª and 61ª in their lower ends arranged opposite each other, in the manner shown in Figs. 3 and 8, so that either may be engaged by a tiltable driving lug 62 pivoted and carried by a driven member 63. This member 63 is the one referred to as the secondary mechanism or member. Driving lug 62 is pivoted at 64 on the member 63 and it has an extension or guide finger 65 projecting downwardly from its pivot and adapted to fall on either side of ribs 66 which are arranged on the interior of the casing 27 under the pivot 64. There is a space or slot 67 between the two adjacent ends of ribs 66, through which slot the guide finger 65 may pass to go from one side to the other of the ribs. The driving lug 62 is manipulated by pulling upon the stem 44. Stem 44 connects directly with a lug 71 engaging under the upper end 72 of a yoke 73 whose lower end connects directly at pivot 74 with the driving lug 62. A spring 75 normally presses the yoke 73 down and normally holds the driving lug in the position shown in Fig. 3, so that the guide finger 65 normally travels on the side of lugs 66 at which it is shown in Fig. 3. With the guide finger on this side of rib 66, the lug 62 will engage in the slot 61ª of arm 61, and any movement of driven member 63 will cause a movement of arm 61 and will cause a movement of arm 31 on the outside of the case. This is the arm which moves the transmission gears to effect the "intermediate" and "high" arrangements of gearing. If it is desired to effect either the "low" or "reverse" arrangements of gearing, it is necessary to pull upwardly on stem 44 and to thereby throw the guide finger 65 through the slot 67 to the opposite side of ribs 66. The driving lug 62 will then engage in slot 60ª of gear shifting arm 60 and arm 30 on the outside of the case will be operated. It thus being explained how selection is made between the one group of "intermediate" and "high" and the other group of "low" and "reverse" arrangements of transmission gearing, it remains to be explained how selection is secured in each of these groups between the two members thereof; that is, how selection is made between "intermediate" and "high" and between "low" and "reverse."

Driven member 63 is loosely mounted on shaft 26 and does not necessarily move therewith except as it is connected to driving member 83 which is rigidly mounted on shaft 26. This driving member is the member referred to as being manually operable. The driven member 63 is normally held in the position shown in Fig. 4, hanging directly downwardly from shaft 26. When in this position, the driving lug 62 must necessarily have carried each of the arms 60 and 61 to their normal central vertical positions, these being the positions corresponding to the "neutral" position or arrangement of the transmission gearing. When member 63 is in this "neutral" position, it is engaged on opposite sides by suitable stop pins 84 and 85. These pins are mounted in suitable sleeves 86 and are normally pressed forwardly against the member 63 by means of springs 87, these springs being intended to move the stop pins 84 and 85 back to their normal positions shown in Fig. 8, after they have been moved therefrom by the operation of the mechanism. The stop pins are normally held in their positions shown in Fig. 8 by means of automatically controlled pins 88 and 89. These pins enter annular grooves 90 in the stop pins and thus hold the stop pins from moving back and prevent the member 63 from moving from its normal central position until one or the other of the pins 88 or 89 is withdrawn. Pins 88 and 89 are pressed into position by means of springs 91; and they are withdrawn from position by the stems 43 and 45 connected thereto. Thus a movement upward of stem 43 will remove the pin 88 and will allow the stop pin 84 to be pressed forwardly by the member 63, allowing member 63 to move forwardly to the position shown in Fig. 7. Moving the member 63 forwardly will move either one or the other of arms 30 or 31 forwardly and will cause the transmission gears to be thrown into either their "low" or "high" arrangement. As before explained, selection between "low" and "high" is effected by proper manipulation of the stem 44, the stem being raised if "low" is selected and allowed to remain in normal position if "high" is selected. Upward movement of stem 45 will cause the removal of the pin 89 and will allow stop pin 85 to be pushed rearwardly when member 63 moves rearwardly as is shown in Fig. 5. In this position either the "intermediate" or "reverse" arrangement of the transmission gears is effected, depending upon the selection made by proper manipulation of stem 44. The remaining portions of the mechanism about to be described consist in the means of connecting the members 63 and 83 together so that the member 63 may be moved as desired; means for locking the member 63 in either its forward or rearward position; and means for actuating the locking mechanism between the members 83 and 63 and between stationary case or frame and the member 63.

Member 63 has a suitable groove or slot 100 in its lower end which is engageable by either of two spring pressed pins 101 and 102 set in such positions as to lock the member 63 in its forward or rearward position when one of the pins enters the slot 100. These pins are pressed upwardly by comparatively light springs 103 and are so constructed with reference to the slot that they will enter easily thereinto. Member 63 carries a loose bolt 104 having a limited radial travel in member 63 in such manner that its lower end may be projected to practically fill the slot 100, as is best shown in Figs. 3 and 7. Directly above the loose bolt 104 there is arranged a slidable locking bolt 105. This locking bolt has a projecting end 106 adapted to enter and engage in a suitable recess 107 in the member 63, the recess 107 being opposite the slot 100 and in such position with relation to the loose bolt 104 that one end of the bolt 104 will always project into either slot 100 or recess 107. Locking bolt 105 is radially slidable in driving member 83 and has a relatively heavy spring 108 which presses it outwardly, the spring 108 being stronger than either of the springs 103.

Pivoted at 110 to member 83 is an arm 111 whose free end rests in a recess 112 of locking bolt 105. This arm carries a suitable cam 113, the arm and cam being rigidly connected and relatively immovable. The lower end of the cam 113 has a tooth or shoulder 113ª which is adapted to be engaged either by pawl 114 or pawl 115. Pawl 115 is pivoted at 116 to the frame of the device and pawl 114 is pivoted at 117 thereto. A spring 118 is arranged between the pawls in such manner as to tend to rotate them in the directions indicated. The engaging end of pawl 115 is in such position as to engage the cam 113 when the member 83 is in its central position shown in Fig. 6. Movement of the member 83 in the direction opposite to that indicated by the arrow will cause the cam 113 to be rotated and to move the arm 111 about the pivot 110 and to thereby raise the locking bolt 105 from the position shown in Fig. 6 toward the position shown in Fig. 5 (relative to the member 83). This means that the end 106 of the locking bolt is withdrawn upwardly from the recess 107 in member 63 and allows member 63 to remain in the position shown in Fig. 6 while member 83 moves toward the left to its normal position shown in Fig. 4. The normal position of member 83 is also shown in Fig. 5; this is the position in which it remains when the clutch is engaged and when the clutch lever 22 is in the position shown in Fig. 1. It has been explained how movement of the clutch lever 22 in the direction indicated (to open the clutch) will rotate the shaft 26 in the direction indicated in Fig. 1, being the same direction as indicated in the other figures; and how letting the clutch lever 22 back to position will rotate shaft 26 in the opposite direction and will thus move member 83 back to the position shown in Fig. 5. When member 83 has moved back to this position shown in Fig. 5, the cam 113 may have been engaged by the pawl 115, with the result of dropping member 63 in the position shown in Fig. 4; or the pawl 115 may have been lowered so that the member 63 is carried on to the position shown in Fig. 5. Pawl 114 first engages the cam when the member 83 is directly on the radial line of locking pin 102; so that, when the member 83 has carried the member 63 to the position shown in Fig. 5, the locking bolt 105 will be moved upwardly and will drop the member 63 in a position where the locking pin 102 will enter slot 100 of the member 63 and hold it there in position. Pawl 115 is controlled in its action by a lever 120 pivoted at 121 to the frame and having one end 120ª engaging a lug 115ª projecting outwardly from pawl 115 while the other end of lever 120 engages at 120ᵇ with pin 89. The arrangement is such that, when the pin 89 is withdrawn, the end 120ª of lever 120 will press down on the pawl 115 and move it to a position so that the cam 113 will pass over the pawl without being actuated by it. This means that when the stem 45 is moved upwardly and the stop 85 released, the locking bolt 105 will not be moved in member 83 as the member 83 moves from the position shown in Fig. 6 toward the position shown in Figs. 4 and 5; but on arriving at the position shown in Figs. 4 and 5, the cam 113 will then be engaged by the pawl 114 and the locking bolt will be moved to disengage the member 63 and drop the member 63 in the position shown in Fig. 5.

Member 83 moves from the extreme position shown in Fig. 5 to the extreme position shown in Fig. 7 and back again, upon each actuation of the clutch pedal 22. In order to drop the member 63 in the position shown in Fig. 7 and in order to again pick it up from that position and carry it to any of the other positions, I have provided certain apparatus which will now be described. As before stated, member 63 is normally in its central position as shown in Figs. 4 and 6. When the member 83 is moved from the position shown in Fig. 5 to the position shown in Fig. 6 it will be seen that the locking bolt 105 will be pressed by its spring 108 directly into the recesses 107 of member 63 and the member 63 will be carried on with the member 83 toward the position shown in Fig. 7. Upon reaching this position the locking bolt 105 is moved upwardly to the position shown in Fig. 7 by the action of a wedge 130 pivoted at 131 to the frame of the device and held normally in the position shown in Figs. 4 and 5 by a spring 132 and a stop lug 133 which engages with the frame.

The projecting end 134 of the wedge is pointed, as is shown in the drawings, Figs. 9 and 10, and is adapted to ride up on a surface 135 of member 63 as is shown in Figs. 7 and 9. The point of the wedge engages beneath the surface 164 on the lower end of locking bolt 105, and as the wedge is moved upwardly toward the position shown in Figs. 7 and 9 its moving end raises the locking bolt toward the position shown in Figs. 7 and 9. The arrangement is such that the locking bolt is removed from the recess 107 when the member 63 reaches the position shown in Fig. 7. Removing the locking bolt from the recess and removing its pressure from the loose bolt 104 allows the locking pin 101 to enter slot 100 of lower end of member 63 and to lock the member as shown in Fig. 7. The wedge 130 will be held as shown in Fig. 7 as long as the member 63 is in its position shown in Fig. 7; and, as the member 83 moves back toward its normal position the locking bolt 105 will be held up in the position shown in Fig. 7 until it has passed to a position where, when released to be pressed down by its spring 108, it will not enter the recess 107. Thus the member 83 will be unlocked from the member 63 and will be enabled to pass back to its original normal position without carrying the member 63 with it. It will be seen that, with the construction shown, it is not necessary that the bolt 105 be moved from the recess 107 with any extreme accuracy; that is, it is not necessary that the bolt leave the recess just as the member 63 moves to position over the locking pin 101. The member 63 is not only driven forwardly by the engagement of the locking bolt 105 with the recess 107, but is also driven in that direction by the engagement of a shoulder 110 on member 83 with a shoulder 111 on member 63. In other words, these shoulders being permanent and immovable on their respective members, the member 63 is always carried forwardly when it is engaged by the member 83 but is not necessarily carried rearwardly; this arrangement being for the reason that the normal position of the member 83 is always to the rear of any position which member 63 may take.

It being assumed that member 63 is now in the position shown in Fig. 7 and that member 83 is in the position shown in Fig. 4 it will now be explained how, on the next forward movement of member 83, the member 63 is picked up and carried rearwardly with the member 83; and it will then be understood how the member 83 alternately leaves and picks up the member 63 in and from the position shown for that member in Fig. 7. The wedge 130 is still held in the position shown in Fig. 7. When the member 83 has passed to the position shown in Fig. 4, the bolt 105 has been dropped down (subject to the action of the pawls 114 and 115) and, when the member 83 comes toward the position of Fig. 7 again, the bolt is pressed down as far as it may be by the spring 108. The bolt is raised by any suitable means, say by an inclined surface 142 on that portion of the driven member 63 which is first approached by the bolt, the bolt then dropping down into the recess 107.

In Fig. 9 the left hand edge, the edge first approached by the bolt, is farther from the center of shaft 26 than is the right hand edge. With reference to the path of movement of the end of the bolt, the surface 142 may be called an inclined surface. After the bolt is raised it then drops into the recess 107 to engage the member 63 and force out the locking pin 101. When the bolt is riding on the surface 142 it will be seen that the bolt surface 165 is low enough to pass beneath the point of wedge 130 which is held in the position shown in Figs. 7 and 9. In other words, the wedge is thrown to such position by the member 63 that it does not operate to lift the bolt under these circumstances. The bolt drops down into recess 107 and the point of wedge 130 rides up over the surface 165 on the bolt. The parts are shown in this position in Fig. 10, being shown in Figs. 7 and 9 in the position assumed when the member 83 drops the member 63 in that position. Although the bolt is higher under the circumstances just explained than when both members 83 and 63 are moved into position simultaneously, it will be noted that, at the times the bolt and wedge engage, the wedge is still higher when the member 63 stands in position shown in Figs. 7 and 9 than when it is moving into that position; with the result that the wedge in one case rides over the bolt and in the other moved under it.

When the wedge moves under the bolt the member 63 is dropped in position shown in Figs. 7 and 9; when the wedge rides over the bolt the member 63 is engaged by the bolt and is then moved rearwardly upon the subsequent rearward movement of member 83, being carried either to its central neutral position or to its rearward position depending upon whether pawl 115 is left in normal position or is pressed down.

With the foregoing description of the machine it is believed that the following description of its operation will be made clear. The members 63 and 83 are normally in the positions shown in Fig. 4. With member 63 in its normal central position the driving lug 62 must also be in its normal central position and the gear shifting arms 60 and 61 must be in their normal positions, which causes the transmission gears to be in "neutral". First let us suppose that it is designed to throw the transmission gearing into the "low" arrangement; that is, the automatic selective mechanism has moved the stems 43 and 44 upwardly. This immediately causes the driving lug 62 to be thrown to the position opposite to that shown in Fig. 3, engaging the lug with the gear shifter arm 60; and it also causes the pin 88 to be withdrawn as is shown in Fig. 7. The clutch or other manual lever is then operated and the member 83 travels from its normal position to the position shown in Fig. 6. The locking bolt 105 immediately slips into place in the recess 107 and the engaging shoulders 140 and 141 carry the member 63 forwardly with the member 83 to the position shown in Fig. 7. (In the drawings, Figs. 6, 7, and 9, the distance between shoulders 140 and 141 is exaggerated.) Here the action of the wedge 130 causes the member 63 to be dropped and allows the locking pin 101 to hold the member 63 in position. Release of the clutch or other pedal or lever allows the member 83 to pass back to its normal position. The gear shifter arm 60 has been carried forwardly with the member 63 and this causes the throwing of the transmission gearing into the "low" arrangement. "Intermediate" is selected by moving stem 45 upwardly, stem 44 being left in its normal position. Movement of the pedal will then move the member 83 forwardly where it will pick up the member 63 as hereinbefore described; upon the rearward movement of the member 83 the member 63 will move rearwardly toward the position shown in Fig. 5. The pawl 115, being pressed outwardly by the upward movement of stem 45, will not engage with cam 113; and the member 63 will consequently be carried past its central "neutral" position and on to the position shown in Fig. 5. And when the parts reach this position the pawl 114 will engage the cam 113 and will move the locking bolt 105 so that it will disengage from recess 107, allowing the locking pin 102 to move up into slot 100 and lock the member 63 in the position shown. In the meantime the driving lug 62 has been carried with the member 63 but, upon the guide finger 65 reaching the slot 67 between the two ribs 66, it will immediately pass through the slot on account of the pressure of spring 75. The passage of the guide finger through the slot means that the lug 62 will disengage the gear shifter arm 60 and will immediately engage the gear shifter arm 61. The gear shifter arm 60 is thus left in its "neutral" position and gear shifter arm 61 is carried to the rear with the further movement of member 63. Carrying gear shifter arm to the rear means that the transmisison gears are placed in their "intermediate" arrangement, as hereinbefore described. "High" is selected by upward movement of pin 43, causing the removal of pin 88 from normal position. This releases the stop pin 84 and allows the member 63 to be carried forward with the member 83 as far as that member will travel. As before noted, the member 63 will always travel forwardly with the member 83 as far as the member 83 travels. If it had been desired to put the gears into "neutral" position from "intermediate" position all that would be necessary would be merely to release all the pins 43, 44 and 45 and to press on the foot pedal. The locking pin 84 would stop both member 63 and member 83 in the central "neutral" position as is shown in Fig. 6, and upon release of the pedal the member 83 would travel back to its position shown in Fig. 4. In fact, when it is desired to put the mechanism in "neutral" position from any speed position it is only necessary to deënergize all the solenoids 40, 41, and 42 and to operate the clutch pedal. It will be seen that the member 83 will pick up the member 63 from either of its positions; and if it picks up the member 63 in its forward position and moves it rearwardly, then the pawl 115 will cause the operation of cam 113 to drop the member 63 in its "neutral" position. If it picks up the member 63 in its rear position, then the operation of the stop pin 84 will be to stop the movement of both members in the central position, and the pawl 115 will then engage with cam 113 to move the locking bolt 105 to leave the member 63 in its "neutral" position when the member 83 moves rearwardly.

The mechanical features of my invention having now been explained, it remains to explain the automatic selective mechanism, which is preferably electrical in its nature. I refer particularly to Figs. 1 and 12. The numeral 170 may designate an ordinary speedometer connected in the usual manner to one of the wheels of the automobile, so that the speedometer hand, shown in Fig. 12 at 171, will move in the direction indicated as the speed of the car increases, and move in the opposite direction as the speed of the car decreases. In the diagram of Fig. 12, I have merely shown a diagram of the face of the speedometer, showing my special contacts 172, 173 and 174 mounted so as to be contacted by the hand 171. These contacts may be of any suitable extent. For instance, I may make the low contact 172 extend from zero to four miles per hour, the intermediate contact 173 extend from four miles per hour to ten miles per hour, and the high contact 174 extend on from ten miles per hour. Current is had from any suitable source, say a battery 175. From the battery 175 a wire 176 leads to switch 177 whose nature will be hereinafter set forth, this switch being normally closed. Wire 178 leads from the switch to the hand 171 of the speedometer. Wires 179, 180 and 181 lead from the contacts 172, 173 and 174 respectively to the various solenoids 40, 41 and 42 mounted upon the gear shifting device "D". A branch wire 182 leads from wire 178 through a push button or similar normally open switch 183, from which wire 184 leads along with wires 179, 180 and 181 to the solenoids 41 and 42 on the gear shifting device. Each of the solenoids 40, 41 and 42 has preferably two separate windings 185 and 186. There is an armature core for each solenoid, as 187 for solenoids 40 and 42 and 187$^a$ for solenoid 41, these cores being mounted directly upon the stems 43 and 45 and connected through the medium of spring 44$^b$ with stem 44. The core 187$^a$ for solenoid 41 is mounted upon upper stem 44$^a$ which lifts stem 44 through the compression spring 44$^b$. It will be seen from inspection of Fig. 3 that the stem 44 cannot be moved upwardly except when the parts are in their central positions opposite the slot 66 through the ribs. The core 187$^a$ and upper stem 44$^a$ may move upwardly at any time; the stem 44 may then subsequently follow when the parts reach their central positions, the spring 44$^b$ being stronger than spring 75. Energization of any solenoid by passage of current through either of its windings will cause the corresponding core to rise and lift the corresponding stem 43, 44 or 45. When the stem has been lifted a distance slightly more than is necessary to cause the proper operation of the corresponding part of the device "D", a small detent 190 will be spring pressed under a shoulder 191 near the upper end of the stem to hold the stem in this upper position after the solenoid is deënergized. The detent 190 is normally pressed forwardly by a spring 192 and may be pulled rearwardly by the action of a small solenoid 193. The detent 190 has a stem 194 at its rear end which engages with a spring switch 195. When the detent springs in under the shoulder on the stem 43, 44 or 45, the switch 195 opens; and the opening of this switch operates to cut the circuit supplying current to the corresponding solenoid 40, 41 or 42. Mounted upon each of the solenoids 40, 41 and 42 is a light armature 200 adapted by its movement to open and close two switches 201, and 202. A spring 203 normally holds the armature in the position shown in Fig. 12; and the armature 200 is immediately attracted by a pole piece 204 of its solenoid as soon as that solenoid is energized and before the corresponding core 187 has moved to any extent. In the normal position of armature 200 shown in Fig. 12, the switch 202 is closed; when the armature 200 moves to the position shown in Fig. 5 the switch 201 is closed and the switch 202 allowed to open.

A wire 210 leads from the other side of battery 175 to a distributing wire 211, from which distributing wire 211, wires 212 lead to one side of normally closed switches 202. Wires 213 lead from the other side of the switches 202 to the winding of corresponding solenoids 193; and wires 214 lead from the other side of windings of solenoids 193 to common wire 215. Another distributing wire 216 leads from wire 178 at the opposite side of the battery from wire 210; and distributing wire 216 may be connected with common wire 215 through any one of switches 201 which happen to be closed by the action of the corresponding armature 200. The switches 201 are connected between distributing wire 216 and common wire 215 by wires 217 and 218, as illustrated. Closure of any one of switches 201 will throw current into wire 215. Current from wire 215 will flow through wire 214, solenoids 193, wires 213 and through those switches 202 which are closed and thence through wires 212, distributing wire 211 and wire 210 back to the battery. In other words, when any one or more of the solenoids 40, 41 or 42 are energized the action of the corresponding armatures 200 will be to throw current through the detent operating solenoids 193 which correspond to the main solenoids which are not energized; and the withdrawal of these detents 190 will allow any of the stems 43, 44 and 45 which are previously raised to move to their normal positions, causing corresponding actuation of the gear shifting device "D".

Suppose now that the automobile is standing and it is desired to start. The speedometer hand will make the contact with the "low" contact 172 and send current through wire 179. Wire 179 has two branches 179$^a$ and 179$^b$ which connect respectively with one winding of each of the solenoids 41 and 40. The current is thus led to one winding of each of the solenoids 40 and 41 and is then led through wires 220 to the corresponding switches 195 and thence through wires 222 to the distributing wire 211 and back to the battery through wire 210. The core armatures in solenoids 40 and 41 will immediately rise and move the stems 43 and 44ª upwardly (stem 44 rising as hereinbefore explained). When the stems 43 and 44ª have moved upwardly sufficient for proper operation of the gear shifting device "D," the detents 190 will spring under the shoulders 191 on the stems and will hold them in their upper positions. At the same time the switches 195 will open and current through the solenoids will be discontinued; but the stems 43 and 44ª will still be held in their uppermost positions. Actuation of the foot pedal 22 will now cause the shifting of the gears in the gear set to the "low" arrangement and the car may be then started on the "low." As the speed increases, the speedometer hand 171 will come into engagement with "intermediate" contact 173, sending current through the wire 180 which connects to one winding 186 of solenoid 42 only. Current will flow through this winding of the solenoid and through wires 220, switch 195, wire 222, distributing wire 211, and wire 210 back to battery 175. The corresponding armature 200 will be attracted downwardly and will cause the switch 202 to open and the switch 201 to close. Closure of the switch 201 will throw current from distributing wire 216 to common wire 215. The current will flow from common wire 215 through wires 214 of the two solenoids 193 adjacent the solenoids 40 and 41, through the winding of those solenoids 193 and through wires 213, switches 202 and wires 212 back to distributing wires 211 and through wire 210 to the battery 175. The said two solenoids 193 will then be energized to withdraw the detents 190 and allow the stems 43 and 44 to fall. The stem 45 will be raised by the action of solenoids 42 and the corresponding detent 190 will spring in to hold the stem upwardly and the switch 195 will open so that current does not continue to flow through the solenoid 42. The opening of switch 195 can only take place after the armature core 187 of solenoid 42 has risen and been caught. Immediately upon the opening of this switch the armature 200 of solenoid 42 resumes its normal position and switches 201 and 202 resume their normal positions, the opening of switch 201 cutting off the current from the two solenoids 193 adjacent the main solenoids 40 and 41. Thus, at the end of this operation, current is flowing in none of the solenoids and the stem 45 is held in its uppermost position. Subsequent operation of the pedal 22 will throw the gears into intermediate. Increase of speed of the automobile will cause the speedometer hand 171 to engage the "high" contact 174 and to send current through the wire 181. Wire 181 is connected directly to winding 186 of the solenoid 40. Solenoid 40 is thus energized in a manner similar to that just explained for the other solenoids; and at the end of the operation caused by the energization of this solenoid the stem 43 is held in its uppermost position and the stem 45 is dropped, stem 44 having remained in its lowermost position after it was dropped by the operation of the "intermediate" solenoid 42. Subsequent operation of pedal 22 will throw the gears into "high." The normally open reverse button 183 may be mounted upon the steering post of the automobile, or may be mounted in any other convenient position. Manual closure of this button switch will cause current to flow through wire 184 and through its branches 184ª and 184ᵇ to windings 185 of solenoids 41 and 42, thence through wires 220, switches 195, wires 222, 211, and 210 to battery 175. Energization of these two solenoids will cause the stems 44 and 45 to be pulled upwardly and to be subsequently held upwardly and will cause the stem 43 to be dropped to its normal position if it should happen to be held upwardly when the reverse button 183 is operated. This is accomplished by the closure of the two switches 201 (adjacent the solenoids 41 and 42) which connects wire 215 with wire 216. Current then flows from battery 175 through wire 176, switch 177, wires 178, 216, 217, switches 201, wires 218 and 215, right hand wire 214, right hand magnet 193 (adjacent the solenoid 40) wire 213, switch 202, wires 212, 211, and 210 back to battery 175. Right hand magnet (in Fig. 12) is thus energized and stem 43 allowed to drop. Subsequent operation of foot pedal 22 will throw the gears into "reverse."

In order to obtain "neutral" I have explained that it is only necessary to open the switch 177 and to leave all the stems 43, 44 and 45 in their normal positions and to operate the pedal 22. In order to drop any of the stems which may be in their upper positions (and it is seen that one or more of the stems will continuously be in their upper positions when the device is in operation) it is only necessary to energize each of the solenoids 193 and to cut off current completely from the solenoids 40, 41 and 42 to prevent any one of them acting as soon as the detents 190 are withdrawn by the actions of solenoids 193. I supply current to the solenoids 193 by the provision of a switch 230 connected by wires 231 and 232 to battery wire 176 and common wire 215 respectively. Current will flow then from wire 215 through the solenoids and the wires 213, switches 202 and wires 212 to the distributing wire 211 and wire 210 back to the battery 175. Each of the solenoids 193 will be energized and all the detents withdrawn, allowing all the stems 43, 44 and 45 to drop. If the parts of the shifting device "D" are in such position as to prevent the stems dropping to their lowermost positions, they will at least drop far enough to throw the shoulders 191 below the detents 190 so that, upon deënergization of the solenoids 193, the detents will not spring under the shoulders 191. Thus, after "neutral" has been once obtained, the stems 43, 44 and 45 will all remain in their lowermost positions until some further action is directed by the speedometer contact; that is, after "neutral" has once been obtained the parts of the gear selecting and shifting device will all remain in "neutral" position until the apparatus is again set in automatic action by the closure of switch 177 and the opening of switch 230. During the maintenance of switch 177 open and switch 230 closed, the speed of the car may be reduced to zero. Upon the subsequent closure of switch 177 and opening of switch 230, "low" will immediately be selected by the automatic selective device, but the gear shifting mechanism and the gears themselves will remain in "neutral" until the subsequent operation of the foot pedal when "low" will be selected.

The switches 177 and 230 may be constituted as shown in Fig. 11. Each switch comprises a pair of contacts 235 adapted to be connected by commutator segments 236 and 237 mounted upon a sleeve 238 on the hub 239 of a pedal 240 which I shall term the "neutral" pedal. The switch 177 is normally closed, while the switch 230 is normally open. Pressure of the "neutral" pedal will open the switch 177 and will immediately close the switch 230, causing the selection of "neutral" as hereinbefore described. The "neutral" pedal 240 may be connected through the medium of clutch shoulders 241 and 242 with the clutch pedal 22. The arrangement is such that, after the "neutral" pedal has moved sufficiently to open switch 177 and to close switch 230, it then picks up the clutch pedal 22 and further movement of the "neutral" pedal will operate the pedal 22. Thus operation of the "neutral" pedal 240 first selects "neutral" and then operates the pedal 22 to throw the gears to their "neutral" position. The brake pedal 245 may be mounted alongside the other two pedals, making a convenient arrangement. If it is desired to suddenly stop the car, it is only necessary to press both the "neutral" and brake pedals, the engine and car thus being entirely disconnected from the transmission gearing and the brakes set. After release of the "neutral" pedal, the transmission gearing will remain in "neutral" arrangement until the pedal 22 is again operated. In the meantime the automatic selector may have selected any one of the forward speeds of the car, but none of these forward speeds will be put into operation until the pedal 22 is again operated. Thus, when a driver stops his car it is only necessary for him to press the "neutral" pedal and bring the car to a stop with his brakes. In starting the engine of a car and in order to make sure that there are no gears thrown into mesh, it is only necessary that he press the "neutral" pedal to throw out any gears which may happen to be in mesh.

It will be seen that the fundamental of this invention involves the use of a selective mechanism automatic in its operation to select different gear arrangements or different speeds, but that this automatic selector is incapable of actually throwing the gears into the chosen arrangement. The driver may at any time operate the gear shifting mechanism to use the selected speed; and he may at any time obtain "reverse" and "neutral". As hereinbefore pointed out, the invention involves the use of some gear shifting pedal or lever or the like; and it is not necessary to this invention that this member be the clutch pedal or be connected therewith. Coöperation of the clutch and gear shifting mechanism is included in a specific aspect of my invention but not in its broadest aspect.

As hereinbefore explained, my automatic selection is effected and controlled by some or other of the changing conditions of propulsion of the automobile. There are several conditions which vary with variations in propulsion conditions; among which are the speed at which the car travels, the speed of the engine, and the torque on the transmission or other power shaft. I prefer to use change of speed to effect my automatic selection, because (1) the mechanism for such use is simple and effective and, (2) the driver of his own volition uses the selected speed or not. It is not supposed that the automatic selector will always select the speed wished by the driver; but he is not forced to change speeds by the automatic selector. Consequently, I prefer to have my automatic selector controlled by car speed, although I do not limit myself to this specific feature. In using this form of control I may prefer to drive the selector speedometer in the ordinary manner through shaft 170ᵃ from the wheel of the car; which, in effect, is indirectly driving it from the driven or final shaft "G¹" of the transmission mechanism. Or, as shown in Fig. 2, I may drive the speedometer shaft 170ᵇ directly from the shaft "G¹." In any case the speedometer is controlled by the speed of the car or by the speed of the final shaft of the transmission, these two speeds varying together.

Having described my invention, I claim:

1. In an automobile, the combination of a driving gear comprising a motor and a change speed mechanism driven by the motor capable of effecting different speed ratios between the motor and the driving wheels of the automobile, a speed shifting mechanism adapted for manual operation capable of being set for different subsequent speed shifting operations while the change speed mechanism is in operation, and automatic selective means connected to and controlled by the speed of the driving gear for selectively setting said shifting mechanism for different subsequent speed shifting operations.

2. In an automobile, the combination of a driving gear comprising a motor and a change speed mechanism driven by the motor capable of effecting different speed ratios between the motor and the driving wheels of the automobile, a manually operable speed shifting member, a series of connecting media capable of being set into and out of operative relation between said member and said change speed mechanism and adapted to cause different speed changes in said mechanism by virtue of movement of said member, and automatic selective means connected to and controlled by the speed of the driving gear for setting said connecting media into and out of operative relation.

3. In an automobile, the combination of a driving gear comprising a motor and a change speed mechanism driven by the motor capable of effecting different speed ratios between the motor and the driving wheels of the automobile, a speed shifting member, a mechanism embodying a series of connecting media capable of being set into and out of operative relation between said member and said change speed mechanism and adapted to cause different speed changes in said mechanism by virtue of movement of said member, and automatic selective means connected to and controlled by the speed of the driving gear for setting said connecting media into and out of operative relation, said means and connective media coöperating so that one of said connective media is always in operative relation to the change speed mechanism and the speed shifting member.

4. In an automobile, the combination of a driving gear embodying a motor, a clutch and a transmission mechanism adapted to be driven thereby and embodying shiftable change speed gears, a gear shifting mechanism capable of being set for different selected gear changes, selective means connected to and controlled by the speed of the driving gear for selectively setting said shifting mechanism, and means operative to disengage said clutch and actuate said shifting mechanism to shift said gears to produce the selected gear change when moved in one direction.

5. In an automobile, the combination of a driving gear embodying a motor and a transmission mechanism through which the automobile is driven from the motor embodying shiftable change speed gears, a gear shifting mechanism capable of being set for different selected gear changes while a previously selected gear is in operation, selective means connected to and automatically controlled by the speed of the driving gear for effecting the selective setting of said shifting mechanism, and means manually operable at will to actuate said shifting mechanism to shift said gears to produce the selected gear change.

6. In an automobile, the combination of a driving gear embodying a motor and a transmission mechanism adapted to be driven thereby and embodying shiftable change speed gears, a gear shifting mechanism, selective means connected to and automatically controlled by the speed of the driving gear for setting said shifting mechanism for different selected gear changes, and means to operate said shifting mechanism to shift said gears to produce a selected gear change at one operation.

7. In an automobile, the combination of a driving gear embodying a motor, a clutch and a transmission mechanism through which the automobile is driven from the motor embodying shiftable change speed gears, a gear shifting mechanism coöperative therewith, selective means connected to and automatically controlled by the speed of the driving gear for setting said shifting mechanism to select different gear changes, and means to disengage said clutch and operate said shifting mechanism to produce the selected gear change when operated in one direction and to engage said clutch when operated in a reverse direction.

8. The combination of a transmission mechanism embodying a driving and a driven shaft, and shiftable change speed gears between the two shifts, a gear shifting mechanism, selective means automatically controlled by the speed of rotation of said driven shaft for setting said shifting mechanism for different selected gear changes, a clutch adapted to drive the transmission mechanism, and means operative to disengage said clutch and to actuate said shifting mechanism to produce a selected gear change.

9. The combination of a transmission mechanism embodying a driving and a driven shaft and shiftable change speed gears, a gear shifting mechanism, selective means automatically controlled by the speed of rotation of said driven shaft to set said shifting mechanism for different selected gear changes, and means to actuate said shifting mechanism to produce the selected gear change.

10. The combination of a transmission mechanism embodying a driving and a driven shaft and shiftable change speed gears, a gear shifting mechanism, selective means automatically controlled by the speed of rotation of said driven shaft for setting said shifting mechanism for different selected gear changes, a clutch adapted to drive said transmission mechanism and means to disengage the clutch and to actuate said shifting mechanism to produce the selected gear change at one operation.

11. The combination of a transmission mechanism embodying a driving and a driven shaft and shiftable change speed gears between said shafts, a gear shifting mechanism, selective means automatically controlled by the speed of rotation of said driven shaft for setting said shifting mechanism for different selected gear changes, and manually operable means to actuate said shifting mechanism to produce the selected gear change at one operation.

12. The combination of a transmission mechanism embodying a driving and a driven shaft and gear changing means between said shafts, a clutch coöperative therewith, a pedal operative to engage and disengage the clutch, a mechanism for operating said transmission mechanism to effect different gear changes, selective means automatically controlled by the speed of rotation of said driven shaft to set said transmission operating mechanism for different selected gear changes, and means connecting said transmission operating mechanism to said pedal to operate said transmission operating mechanism to effect the selected gear change when said pedal is operated to disengage the clutch.

13. The combination with a driving and a driven shaft and a variable speed transmission mechanism therefor, including a plurality of sets of power transmission elements, means for placing any set of said transmission elements in and out of driving relation with the shaft, and selective mechanism automatically controlled by the final speed of the transmission mechanism by which one set of said transmission elements is automatically selected for subsequent operation while another set of transmission elements is in operation.

14. The combination of a transmission mechanism embodying a driving and a driven shaft and a change gear mechanism, a gear changing mechanism capable of being set for different selected gear changes while a previously selected gear is in operation, selective means automatically controlled by the speed of rotation of one of the shafts to set said gear changing mechanism for different selected gear changes, means manually operable to set said gear changing mechanism for neutral selection, and means manually operable at will to actuate said gear changing mechanism to produce the selected gear change.

15. The combination of a transmission mechanism embodying a driving and a driven shaft and a change gear mechanism capable of effecting different relative rates of rotation between the shafts in one relative direction and of effecting rotation of the shafts in the reverse relative direction, a gear changing mechanism capable of being set for different selected gear changes while a previously selected gear is in operation, selective means automatically controlled by the speed of rotation of one of the shafts to set said gear changing mechanism for different selected gear changes, means manually operable to set said gear changing mechanism for reverse selection, and means manually operable at will to actuate said gear changing mechanism to produce the selected gear change.

16. The combination of a transmission mechanism embodying a driving and a driven shaft and a change gear mechanism capable of effecting different relative rates of rotation between the shafts in one relative direction and of effecting rotation of the shafts in the reverse relative direction, a gear changing mechanism capable of being set for different selected gear changes while a previously selected gear is in operation, selective means automatically controlled by the speed of rotation of one of the shafts to set said gear changing mechanism for different selected gear changes, means manually operable to set said gear changing mechanism for reverse selection, means manually operable to set said gear changing mechanism for neutral selection, and means manually operable at will to actuate said gear changing mechanism to produce the selected gear change.

17. In an automobile, the combination of a driving gear embodying a motor and a change speed mechanism driven by the motor capable of effecting different speed ratios between the motor and the driving wheels of the automobile, a speed shifting mechanism adapted for manual operation and capable of being set for different subsequent speed shifting operations while the change speed mechanism is in operation at a previously selected speed, automatic selective means connected to and controlled by the speed of the driving gear for selectively setting said speed shifting mechanism for different speed shifting operations, and manually operable selective means for selectively setting said speed shifting mechanism for reverse relation to be obtained by subsequent manual operation of said mechanism.

18. In an automobile, the combination of a driving gear embodying a motor and a change speed mechanism driven by the motor capable of effecting different speed ratios between the motor and the driving wheels of the automobile, a speed shifting mechanism adapted for manual operation and capable of being set for different subsequent speed shifting operations while the change speed mechanism is in operation at a previously selected speed, automatic selective means connected to and controlled by the speed of the driving gear for selectively setting said speed shifting mechanism for different speed shifting operations, means for manually setting said shifting mechanism for reverse speed change, and means for manually discontinuing the action of said automatic selective means and for setting said shifting mechanism to neutral.

19. In an automobile, the combination of a driving gear embodying a motor and a change speed mechanism driven by the motor and capable of effecting different speed ratios between the motor and the driving wheels of the automobile in one relative direction of rotation and of effecting rotation in the reverse relative direction, a speed shifting mechanism embodying a manually operable speed shifting member and a series of connective media between said member and the change speed mechanism adapted to cause different speed changes in said mechanism by virtue of movement of said member, automatic selective means connected to and controlled by the speed of the driving gear for setting said connective media into and out of action to cause different speed changes in the first mentioned relative direction of rotation upon manual operation of the speed shifting member, manually operable means for setting said connective media into and out of action for causing speed change to the reverse direction upon manual operation of the speed shifting member, both of said means and said connective media being coöperated so that one of said connecting media is always in operative relation to the change speed mechanism and the speed shifting member, and manually operable means for rendering said automatic selective means temporarily inoperative and for setting of said connective media for neutral.

20. In an automobile, the combination of a driving gear embodying a motor and a change speed mechanism driven by the motor and capable of effecting different speed ratios between the motor and driving wheels of the automobile in a relative forward direction of rotation and of effecting rotation in a relatively reversed direction, a speed shifting mechanism adapted for manual operation capable of being set for different speed shifting operations while the change speed mechanism is in operation, automatic selective means connected to and controlled by the speed of the driving gear for selectively setting said speed shifting mechanism for different subsequent speed shifting operations in the forward relation of rotation, manually operable means for selectively setting said speed shifting mechanism for speed operation to reverse, and manually operable means for temporarily throwing said automatic selective means out of operation and for setting said speed shifting mechanism for subsequent operation to shift the change speed mechanism to neutral.

21. The combination of a transmission mechanism embodying a driving and a driven shaft and shiftable change speed gears, a gear shifting mechanism capable of being set for different selected gear changes while a previously selected gear is in operation, selective means automatically controlled by the speed of rotation of said driven shaft to set said mechanism for different selected gear changes, and means manually operable at will to actuate said shifting mechanism to produce a selected gear change.

22. The combination of a driving and a driven shaft and a variable speed transmission mechanism therefor, including a plurality of sets of power transmission elements, means for placing any set of said transmission elements in and out of driving relation with the shaft, said means being manually operable at will and selective mechanism automatically controlled by the final speed of the transmission mechanism by which one set of said transmission elements is automatically selected for subsequent operation while another set of transmission elements is in operation.

23. The combination of a driving and a driven shaft and change speed mechanism therefor, means for operating said mechanism to cause change in speed at will, and selective mechanism automatically controlled by the final speed of the change speed mechanism for continuously and automatically selecting a speed change to be obtained by subsequent operation of said change speed operating means.

24. The combination of a transmission mechanism embodying a driving and a driven shaft and a change speed mechanism between the two shafts, a speed changing mechanism capable of being selectively set for subsequent speed changing operations while the change speed mechanism is in operation, selective means automatically controlled by the speed of one of said shafts to selectively set said speed changing mechanism, and means manually operable at will to actuate said speed changing mechanism to produce a selected speed change.

25. In an automobile, the combination with a driving gear embodying a motor and a change speed mechanism through which the motor drives the automobile, of a manually operable speed shifting mechanism capable of being set while the change speed mechanism is in operation to effect different selected speed changes, and selective means connected to and automatically controlled by the speed of the driving gear for effecting continuous selective setting of said shifting mechanism for subsequent manual operation.

26. In an automobile the combination with a driving gear embodying a motor and a change speed mechanism through which the motor drives the automobile, of a speed changing mechanism capable of being set for different selected speed changing operations while the change speed mechanism is in operation, a selective means connected to and automatically controlled by the speed of the driving gear for effecting selective setting of said speed changing mechanism for subsequent operation, and a speed shifting member manually operable at will co-operating with the speed changing mechanism to cause speed changing as determined by the speed controlled mechanism.

27. In an automobile, the combination of a driving gear embodying a motor, a clutch and a change speed mechanism through which the motor drives the automobile, a speed shifting mechanism adapted to be selectively set for subsequent operation while the change speed mechanism is in operation, selective means connected to and automatically controlled by the speed of the driving gear to selectively set the shifting mechanism for subsequent operation, and means manually operable at will to operate the clutch and operate the shifting mechanism to produce the selected speed change.

28. In an automobile, the combination of a driving gear embodying a motor, a clutch and a change speed mechanism through which the motor drives the automobile, said mechanism being capable of effecting different relative speeds between the motor and automobile in one relative direction and of effecting a speed relation in the reverse relative direction, a speed shifting mechanism adapted to be selectively set for subsequent operation while the change speed mechanism is in operation, selective means connected to and automatically controlled by the speed of the driving gear to selectively set said shifting mechanism for subsequent operation, means for manually setting said shifting mechanism for reverse selection, and means manually operable at will to operate the clutch and operate the shifting mechanism to produce the selected speed change.

29. In an automobile, the combination of a driving gear embodying a motor and a change speed mechanism driven by the motor capable of effecting several different speed ratios between the motor and the driving wheels of the automobile, a speed shifting mechanism adapted for manual operation capable of being set for different subsequent speed shifting operations while the change speed mechanism is in operation at a previously selected speed, automatic selective means connected to and controlled by the speed of the driving gear for selectively setting said speed shifting mechanism for some of the different speed shifting operations, and manually operable selective means for selectively setting said speed shifting mechanism for another of the several speed shifting operations.

In witness that I claim the foregoing I have hereunto subscribed my name this 20th day of December, 1913.

GERALD A. EDDY.

Witnesses:
JAS. H. BALLAGH,
A. B. DODGE,
JAMES T. BARKELEW.